(12) United States Patent
Itoh et al.

(10) Patent No.: US 10,691,178 B2
(45) Date of Patent: Jun. 23, 2020

(54) INFORMATION PROCESSING APPARATUS, CONTROL METHOD, AND PROGRAM

(71) Applicant: LENOVO (SINGAPORE) PTE. LTD., Singapore (SG)

(72) Inventors: Hiroshi Itoh, Yokohama (JP); Fusanobu Nakamura, Yokohama (JP); Kazuhiro Kosugi, Yokohama (JP); Koji Kawakita, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/034,350

(22) Filed: Jul. 13, 2018

(65) Prior Publication Data
US 2019/0310689 A1 Oct. 10, 2019

(30) Foreign Application Priority Data

Apr. 6, 2018 (JP) ................. 2018-074121

(51) Int. Cl.
*G09G 5/00* (2006.01)
*G06F 1/16* (2006.01)
*G01H 1/00* (2006.01)
*G06F 3/16* (2006.01)

(52) U.S. Cl.
CPC ............. *G06F 1/1677* (2013.01); *G01H 1/00* (2013.01); *G06F 3/167* (2013.01)

(58) Field of Classification Search
CPC .... G06F 1/1677; G06F 1/3287; G06F 1/3231; G06F 3/167; G06F 3/0221; G01H 1/00
USPC .................... 345/169, 901; 361/681
See application file for complete search history.

(56) References Cited

U.S. PATENT DOCUMENTS

| | | | | |
|---|---|---|---|---|
| 2012/0239955 A1* | 9/2012 | Yanase | .................. | G06F 1/1624 713/323 |
| 2015/0031347 A1* | 1/2015 | Kim | ..................... | H04M 1/0245 455/418 |
| 2017/0010657 A1* | 1/2017 | Schneider | ................ | G01B 5/24 |

FOREIGN PATENT DOCUMENTS

| | | |
|---|---|---|
| JP | 2005347843 A | 12/2005 |
| JP | 2009130694 A | 6/2009 |
| JP | 2012050149 A | 3/2012 |
| JP | 2012-168783 A | 9/2012 |
| JP | 2012244435 A | 12/2012 |
| WO | 2011115035 A1 | 6/2013 |
| WO | 2017100754 A1 | 6/2017 |

* cited by examiner

*Primary Examiner* — Jennier T Nguyen
(74) *Attorney, Agent, or Firm* — Shimokaji IP

(57) ABSTRACT

An information processing apparatus, a control method, and a program can more accurately distinguish a vibration added to a chassis from the detected vibration. The information processing apparatus includes a first chassis in which at least one first vibration detecting unit is provided; a second chassis in which at least one second vibration detecting unit is provided, a face of the second chassis overlapping with a face of the first chassis; and a controller. The controller determines a contact state of the first chassis based on relative characteristics of a first vibration that is a vibration detected by the first vibration detecting unit with respect to a second vibration that is a vibration detected by the second vibration detecting unit.

12 Claims, 7 Drawing Sheets

INFORMATION PROCESSING APPARATUS, CONTROL METHOD, AND PROGRAM

FIELD OF THE INVENTION

The present invention relates to an information processing apparatus, a control method, and a program.

BACKGROUND OF THE INVENTION

There has been known an information processing apparatus that includes two chassis and can open and close the two chassis by using as its axis an opening-closing mechanism coupled to one side of each chassis. The information processing apparatus includes, for example, a notebook type personal computer (also referred to as a clamshell PC, a laptop PC, a notebook PC, etc.), a foldable cellular phone (also referred to as a foldable mobile etc.), and the like. The information processing apparatus is usually configured to fulfill functions in the state where two chassis are opened and not to fulfill functions in the state where the two chassis are closed.

For example, there has been an information processing apparatus that includes a first chassis including a posture detecting section that detects a posture and a second chassis including a screen that displays a predetermined image (e.g., see Japanese Patent Application Laid-Open No. 2012-168783). Herein, the first and second chassis are connected to each other so that the posture of the second chassis can be changed relative to the first chassis. The posture detecting section estimates the posture of the second chassis on the basis of a value obtained by adding a predetermined offset to the detected detection data and performs a predetermined display on the screen on the basis of the posture of the second chassis.

Recently, there has been proposed an information processing apparatus that provides limited functions even in a state where two chassis are closed. A function provided in the closed state includes a voice command function, for example. A voice command function is a function for recognizing voice commands uttered by a user and performing a process indicated by the recognized voice commands. It is desired that the voice command function operates when a user wants it and does not operate when the user does not want it. This is important also in terms of ensuring of information security and protection of privacy of the user. On the other hand, in order not to damage convenience, it is considered that switching between ON and OFF of the voice command function is performed whenever it is detected that the chassis of the information processing apparatus is tapped. The information processing apparatus includes a sensor that detects vibrations to detect tapping. However, because the sensor also detects vibrations transmitted from a table on which the information processing apparatus is placed, switching between ON and OFF may be performed despite user's intentions.

SUMMARY OF THE INVENTION

The present invention has been achieved to solve the problem, and an information processing apparatus according to the first aspect of the present invention includes a first chassis in which at least one first vibration detecting unit is provided; a second chassis in which at least one second vibration detecting unit is provided, a face of the second chassis overlapping with a face of the first chassis; and a controller that determines a contact state of the first chassis based on relative characteristics of a first vibration that is a vibration detected by the first vibration detecting unit with respect to a second vibration that is a vibration detected by the second vibration detecting unit.

In the information processing apparatus, the relative characteristics may include a strength ratio of the first vibration to the second vibration, and the controller may determine a contact onto the first chassis when the strength ratio is larger than a threshold of a predetermined strength ratio, and may not determine the contact onto the first chassis when the strength ratio is not more than the threshold of the predetermined strength ratio.

In the information processing apparatus, the relative characteristics may include a detection time difference between the first vibration and the second vibration, and the controller may determine a contact onto the first chassis when the first vibration is detected earlier than the second vibration, and may not determine the contact onto the first chassis when the second vibration is detected earlier than the first vibration.

In the information processing apparatus, the controller may define, as a principal vibration zone, a plurality of zones in which a maximum value of a strength is in a predetermined range and an interval between these zones is in a predetermined range for each of the first vibration and the second vibration, and the relative characteristics may include relative characteristics in at least a part of the principal vibration zone.

In the information processing apparatus, the first and second vibration detecting units may include acceleration sensors, and the controller may subtract components of gravitational accelerations from accelerations respectively detected by the first and second vibration detecting units to compute a strength of the first vibration and a strength of the second vibration.

The information processing apparatus further includes an opening-closing mechanism that causes the first chassis to be openable and closable relative to the second chassis while mutually coupling portions of the first chassis and the second chassis, and the controller determines a contact state onto the first chassis when the first chassis is closed relative to the second chassis.

In the information processing apparatus, the controller may detect an open or closed state of the first chassis relative to the second chassis based on directions of gravitational accelerations respectively detected by the first and second vibration detecting units.

In the information processing apparatus, the first and second vibration detecting units may be provided at positions closer to a second lateral side facing a first lateral side than the first lateral side on which the opening-closing mechanism is provided.

In the information processing apparatus, the controller may determine whether a predetermined function is required in accordance with a contact state onto the first chassis.

The information processing apparatus further includes a notifying unit that notifies a user of a state where the predetermined function is operating when the controller determines that the predetermined function is required.

In a control method executed by an information processing apparatus according to the second aspect of the present invention, the information processing apparatus includes: a first chassis in which at least one first vibration detecting unit is provided; and a second chassis in which at least one second vibration detecting unit is provided, a face of the second chassis overlapping with a face of the first chassis, and the control method includes determining a contact state of the first chassis based on relative characteristics of a first vibration that is a vibration detected by the first vibration detecting unit with respect to a second vibration that is a vibration detected by the second vibration detecting unit.

In a program according to the third aspect of the present invention, the program causes a computer of an information processing apparatus to execute a process, the information processing apparatus includes: a first chassis in which at least one first vibration detecting unit is provided; and a second chassis in which at least one second vibration detecting unit is provided, a face of the second chassis overlapping with a face of the first chassis, and the process includes determining a contact state of the first chassis based on relative characteristics of a first vibration that is a vibration detected by the first vibration detecting unit with respect to a second vibration that is a vibration detected by the second vibration detecting unit.

An information processing apparatus according to the fourth aspect of the present invention includes: a first chassis; a second chassis; an opening-closing mechanism that causes the first chassis to be openable and closable relative to the second chassis while mutually coupling portions of the first chassis and the second chassis; and a controller being configured to: detect an operation onto the apparatus itself; execute a first process as a process corresponding to the operation when the first chassis is opened relative to the second chassis; and execute a second process different from the first process as a process corresponding to the operation when the first chassis is closed relative to the second chassis.

An information processing apparatus according to the fifth aspect of the present invention includes: a chassis in which first and second vibration detecting units are provided; and a controller that determines a contact state of the chassis based on relative characteristics of a first vibration that is a vibration detected by the first vibration detecting unit with respect to a second vibration that is a vibration detected by the second vibration detecting unit, the first vibration detecting unit detects a vibration of a first surface of the chassis, and the second vibration detecting unit detects a vibration of a second surface different from the first surface.

Effects of the Invention

The above-described aspects of the present invention can distinguish a vibration added to the first chassis from the detected vibrations. Moreover, switching between ON and OFF of a function can be more accurately performed on the basis of the distinguished vibration.

DETAILED DESCRIPTION OF THE INVENTION

Hereinafter, an embodiment of the present invention will be explained with reference to the accompanying drawings. First, an information processing apparatus 1 according to the embodiment will be briefly explained. In the following explanations, the case where the information processing apparatus 1 is a notebook PC is mainly explained as an example. The information processing apparatus 1 is not necessarily limited to a notebook PC. Therefore, it may be a tablet terminal device, a smartphone, or the like.

Figure 1:
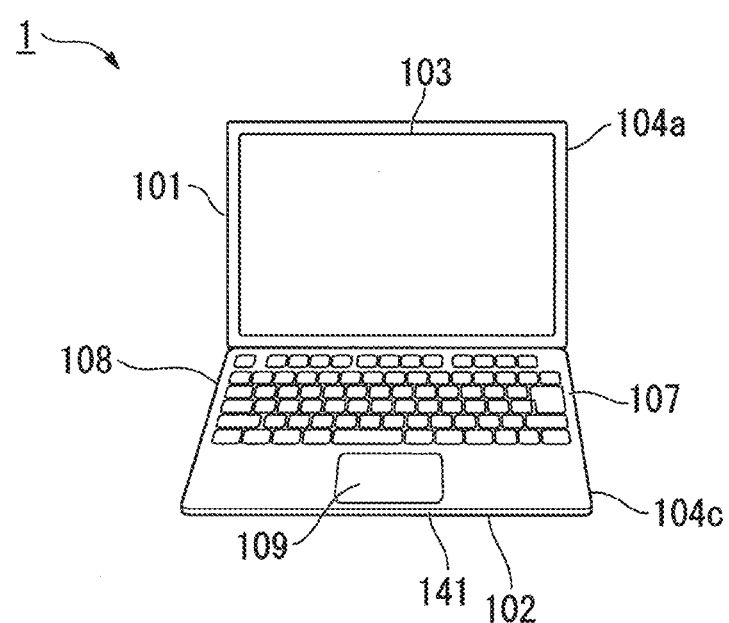
FIG. 1 is a perspective diagram illustrating an example of the contour of an information processing apparatus according to an embodiment.
Figure 2:
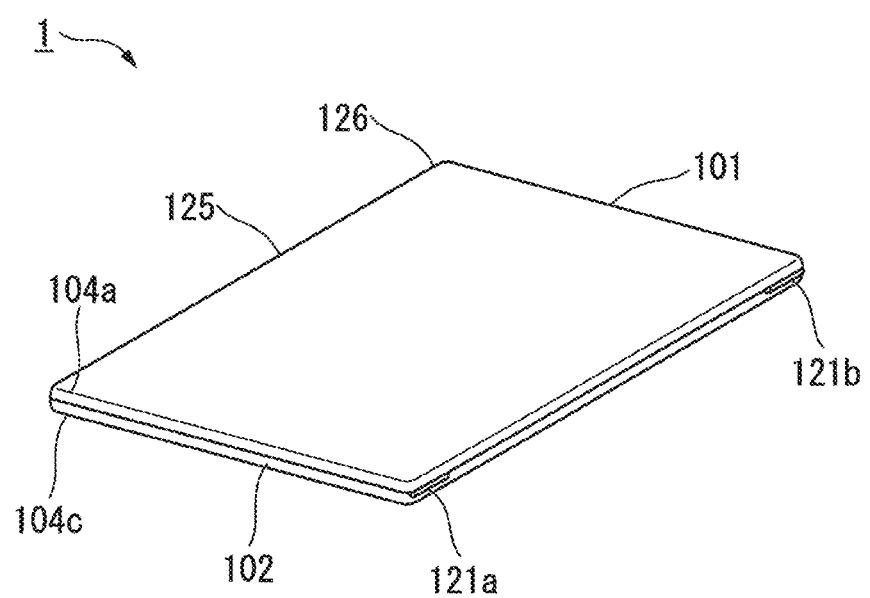
FIG. 2 is a perspective diagram illustrating another example of the contour of the information processing apparatus according to the embodiment.

FIGS. 1 and 2 are perspective diagrams illustrating the contour of the information processing apparatus 1 according to the embodiment. The information processing apparatus 1 includes a first chassis 101, a second chassis 102, and hinge mechanisms 121a and 121b. The first chassis 101 and the second chassis 102 are coupled opposite each other via the hinge mechanisms 121a and 121b along respective lateral sides thereof. The first chassis 101 is rotatable relatively to the second chassis 102 around a rotation axis formed by the hinge mechanisms 121a and 121b. The direction of the rotation axis is parallel to the lateral sides on which the hinge mechanisms 121a and 121b are provided.

The first chassis 101 is also referred to as an A cover or a display chassis. The second chassis 102 is also referred to as a C cover or a system chassis. In the following explanations, among lateral sides of the first chassis 101 and the second chassis 102, lateral sides on which the hinge mechanisms 121a and 121b are provided are referred to as a "rear face". Lateral sides that face the rear face is referred to as a "front face". Moreover, a direction from the front face to the rear face is referred to as "rear", and a direction from the rear face to the front face is referred to as "front". The right and left sides with respect to the rear are respectively referred to as "right" and "left". Moreover, a state where the first chassis 101 overlaps with the second chassis 102 is referred to as a "closed state" or a "state where the first chassis is closed relative to the second chassis." Furthermore, a direction in which the first chassis 101 overlaps with the second chassis 102 in a completely closed state is referred to as "upper", and a direction in which the first chassis 101 is supported on the second chassis 102 is referred to as "lower".

FIG. 1 illustrates a state (hereinafter, may be simply referred to as "open state") where the first chassis 101 is opened relative to the second chassis 102. The open state is a state where the front face of the first chassis 101 is uncoupled from the front face of the second chassis 102. In the open state, the respective inner surfaces of the first chassis 101 and the second chassis 102 appear to allow the information processing apparatus 1 to execute normal operations. The inner surface of the first chassis 101 corresponds to the back relative to the surface of the first chassis 101. A display 103 is mounted on the inner surface of the first chassis 101. In the right surface of the first chassis 101, an acceleration sensor 104a is provided in a region closer to the front face than the rear face on which the hinge mechanisms 121a and 121b are placed.

A keyboard 107 and a touch pad 109 are mounted on the inner surface of the second chassis 102. An LED lamp 141 is provided on the front face of the second chassis 102, and an acceleration sensor 104c is provided on the right surface thereof. An operation switch 108 is provided on the left surface of the second chassis 102. In this regard, however, the operation switch 108 is not illustrated in FIG. 1. The operation switch 108 is used to activate the information processing apparatus 1 by being pressed by the operation of a user in the state where the first chassis 101 is opened relative to the second chassis 102.

FIG. 2 illustrates a state where the first chassis 101 is closed relative to the second chassis 102. In the closed state, the respective inner surfaces of the first chassis 101 and the second chassis 102 do not appear. The surface of the first chassis 101 appears upward, and the bottom of the second chassis 102 contacts a table that supports the second chassis 102 from the lower side. In the closed state, the display 103 is covered by the inner surface of the second chassis 102, and the keyboard 107 and the touch pad 109 are covered by the inner surface of the first chassis 101, so as not to execute normal operations of the information processing apparatus 1. Moreover, in the closed state, the acceleration sensor 104a is arranged at an adjacent position within a predetermined range from the position of the acceleration sensor 104c viewed from the top. In other words, the distance from the rear face of the first chassis 101 to the acceleration sensor 104a is equal to the distance from the rear face of the second chassis 102 to the acceleration sensor 104c, or the difference between these distances approximates zero to fall within a predetermined range.

A microphone 125 and a speaker 126 are arranged in a region more sufficiently adjacent to the front face than the rear face in the surface of the first chassis 101. The microphone 125 is arranged in the substantially central portion between the left end and the right end. The speaker 126 is arranged in a region closer to the left end than the right end. A vibration caused by sound generated by the speaker 126 attenuates in the course of reaching the acceleration sensor 104a by keeping the speaker away from the acceleration sensor 104a. Moreover, by employing this arrangement, regardless of whether the first chassis 101 is opened or closed relative to the second chassis 102, sound absorbing by the microphone 125 and sound emitting by the speaker 126 are not disturbed.

Figure 3:
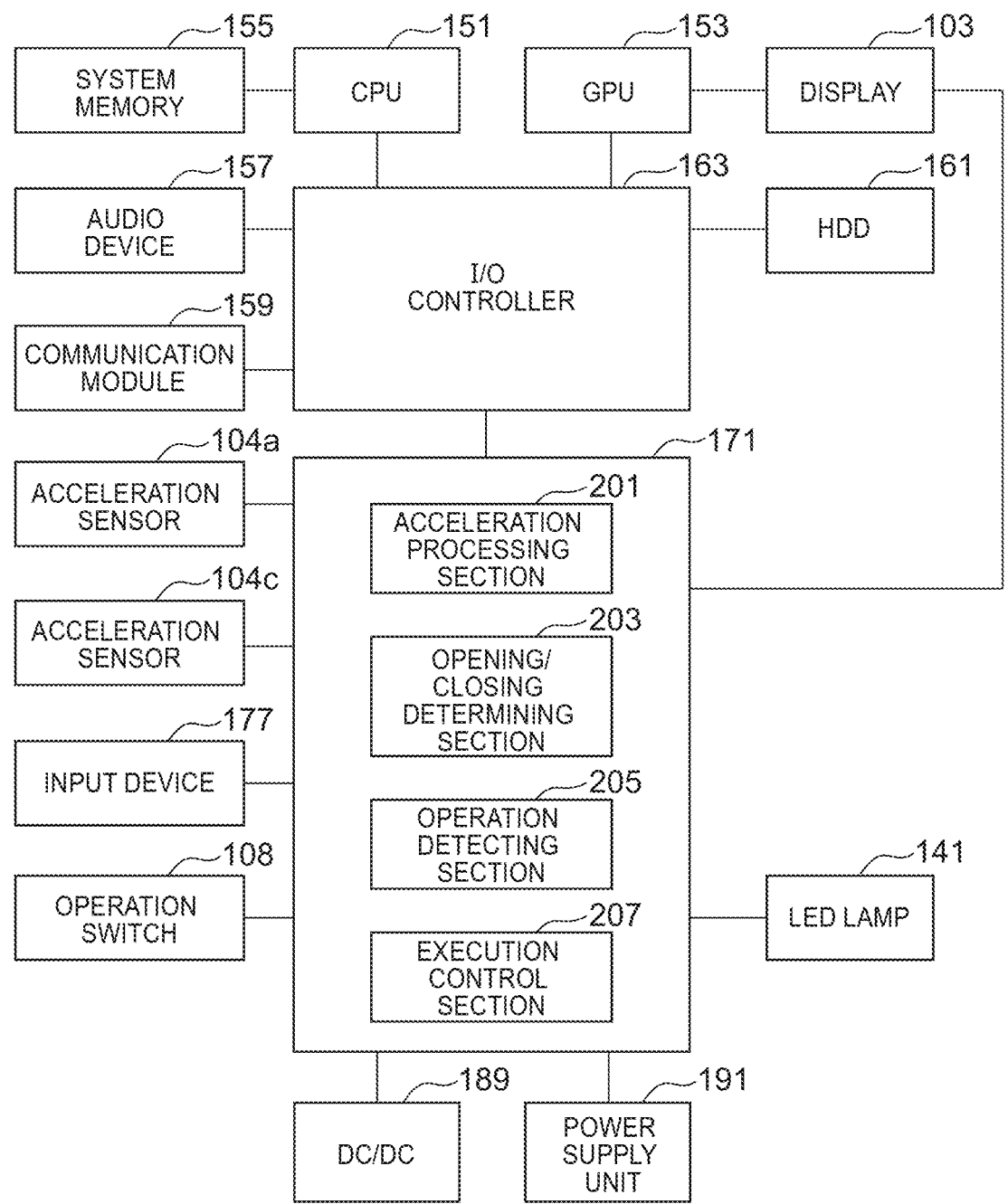
FIG. 3 is a schematic block diagram illustrating the information processing apparatus according to the embodiment.

FIG. 3 is a schematic block diagram illustrating the information processing apparatus 1 according to the embodiment. The information processing apparatus 1 is configured to include system devices and peripheral devices. As the system devices, the information processing apparatus includes a CPU (central processing unit) 151, a GPU (graphics processing unit) 153, and an I/O (input/output) controller 163. The system devices are mounted on the second chassis 102.

A system memory 155 and the I/O controller 163 are connected to the CPU 151.

The display 103 and the I/O controller 163 are connected to the GPU 153. The CPU 151, the GPU 153, an audio device 157, a communication module 159, an HDD (hard disk drive) 161, and an EC (embedded controller) 171 are connected to the I/O controller 163. The audio device 157 includes the microphone 125 and the speaker 126.

The EC 171 is a microcomputer configured to include a processor, a storage medium, and a programmable logic circuit. The processor includes, for example, a CPU other than the CPU 151. The storage medium includes a ROM (read only memory) and a RAM (random access memory), for example. The EC 171 operates independently of the CPU 151, and mainly manages operating environment of the inside or periphery of the information processing apparatus 1.

The processor of the EC 171 reads a control program previously stored in the ROM, performs a process indicated by various types of instructions described in the read control program, and realizes a part or the whole of the function of each component to be described later. According to the present embodiment, performing the process indicated by instructions described in the program may be referred to as "execution (of program)". Moreover, starting the execution may be referred to as "activation".

Signal lines of "the acceleration sensors 104a and 104c, the LED lamp 141, the operation switch 108, an input device 177, and a DC/DC (direct current/direct current) converter 189" and a signal line of "a power supply unit 191" are connected to the EC 171.

The acceleration sensors 104a and 104c respectively detect their own accelerations, and output acceleration data indicative of the detected accelerations to the EC 171. The acceleration sensors 104a and 104c are a three-axis acceleration sensor. The directions of three sensitivity axes included in each of the acceleration sensors 104a and 104c are perpendicular to each other in a three-dimensional space. Moreover, in the state where the first chassis 101 is closed relative to the second chassis 102, the directions of the sensitivity axes of the acceleration sensor 104a are equal to the directions of the sensitivity axes of the acceleration sensor 104c. The detected acceleration is three-dimensional vector quantity that includes the component of a vibration and the component of a gravitational acceleration. As described later, the EC 171 analyzes the detected vibration on the basis of the acceleration data input from the acceleration sensors 104a and 104c.

Under the control of the EC 171, the DC/DC converter 189 converts a voltage of electric power supplied from the power supply unit 191, and supplies the electric power having a predetermined voltage to each device of the information processing apparatus 1. The DC/DC converter 189 supplies electric power to each device in accordance with the instruction of a power control signal input from the EC 171. For example, when detecting the pressing onto the operation switch 108, the EC 171 determines to activate the information processing apparatus 1, and outputs a power control signal indicative of power supply to each device to the DC/DC converter 189. Moreover, event information indicating a preparation completion event for the transition from a standard mode to a sleep mode as a system operation mode of the main body of the information processing apparatus 1 may be input into the EC 171 via the I/O controller 163 from the CPU 151. At this time, the EC 171 provides to the DC/DC converter 189 a power control signal indicating the stop of power supply to the system device.

The power supply unit 191 supplies electric power to the DC/DC converter 189. The power supply unit 191 is configured to include a battery, a battery charger, and an AC/DC (alternating current/direct current) adapter.

Next, the functional configuration of the EC 171 will be explained.

The EC 171 functions as a controller that is configured to include an acceleration processing section 201, an opening/closing determining section 203, an operation detecting section 205, and an execution control section 207.

The acceleration processing section 201 analyzes accelerations indicated by the acceleration data input from the acceleration sensors 104a and 104c. In the following explanations, the acceleration data input from the acceleration sensors 104a and 104c are respectively referred to as first acceleration data and second acceleration data. The acceleration processing section 201 calculates a first gravity value and a second gravity value, which respectively indicate the components of the gravitational accelerations, from a first acceleration at each time indicated by the first acceleration data and a second acceleration at each time indicated by the second acceleration data. The first gravity value and the second gravity value are three-dimensional vector quantity that indicates the directions of the first chassis 101 and the second chassis 102 on which the acceleration sensors 104a and 104c are respectively provided. The acceleration processing section 201 calculates a first vibration strength and a second vibration strength that indicate the sizes of a first vibrational component and a second vibrational component obtained by respectively subtracting the first gravity value and the second gravity value from the first acceleration and the second acceleration. The first vibration strength and the second vibration strength are scalar quantity. The acceleration processing section 201 outputs to the operation detecting section 205 first vibration strength data indicating the calculated first vibration strength at each time and second vibration strength data indicating the calculated second vibration strength at each time. A vibration strength computation process that is performed by the acceleration processing section 201 will be below explained.

The opening/closing determining section 203 determines an open or closed state indicating whether the first chassis 101 is opened or closed relative to the second chassis 102. For example, the opening/closing determining section 203 acquires first gravity data indicating the first gravity value at each time and second gravity data indicating the second gravity value at each time from the acceleration processing section 201, and computes an angle parameter indicating an angular aperture that is an angle formed by the direction of the first chassis 101 indicated by the first gravity value and the direction of the second chassis 102 indicated by the second gravity value. As an angle parameter, the opening/closing determining section 203 computes a cosine value that is obtained by normalizing an inner product of the first gravity value and the second gravity value by using each absolute value, for example. When the angular aperture indicated by the computed angle parameter exceeds a threshold (for example, 60 to 90 degrees) of a predetermined angular aperture, the opening/closing determining section 203 determines the open state where the first chassis 101 is opened relative to the second chassis 102. When the angular aperture indicated by the computed angle parameter is not more than the threshold of the predetermined angular aperture, the opening/closing determining section 203 determines the closed state. The opening/closing determining section 203 outputs the open or closed state data indicating the determined open or closed state to the operation detecting section 205 and the execution control section 207.

When the open or closed state data input from the opening/closing determining section 203 indicates the closed state, the operation detecting section 205 executes a contact determination process described hereinafter. When the open or closed state data indicates the open state, the operation detecting section 205 does not execute the contact determination process. The contact determination process is a process for determining contact related to an operation that is performed on the first chassis 101 by using the first vibration strength data and the second vibration strength data. By performing the process, a vibration accompanied with the contact onto the first chassis 101 performed by a tapping operation is distinguished from a vibration transmitted via the bottom of the second chassis 102 from a table on which the information processing apparatus is placed. The tapping operation is an operation making one part of a body such as a finger or an instrument such as a stylus contact with the information processing apparatus.

The operation detecting section 205 determines the presence or absence of the contact onto the first chassis 101 on the basis of relative characteristics between the first vibration strength indicated by the first vibration strength data and the second vibration strength indicated by the second vibration strength data. As relative characteristics, the operation detecting section 205 computes a strength ratio of the first vibration strength to the second vibration strength, for example. When the computed strength ratio is larger than a threshold of a predetermined strength ratio, the operation detecting section 205 determines that the contact onto the first chassis 101 is made. When the computed strength ratio is not more than the threshold of the predetermined strength ratio, the operation detecting section 205 determines that the contact onto the first chassis 101 is not made. The operation detecting section 205 outputs contact state data indicating the presence or absence of the contact onto the first chassis 101 to the execution control section 207. When determining that the vibration is the vibration transmitted from the table, the execution control section 207 may output the contact state data indicating the vibration transmitted from the table to the execution control section 207. An example of the contact determination process will be described below.

The execution control section 207 controls a process indicated by predetermined commands on the basis of the contact state data input from the operation detecting section 205. In the following explanations, executing a process indicated by commands may be referred to as "execution (of commands)". Moreover, a process indicated by commands may be referred to as a "command process".

When the contact state data indicates the contact onto the first chassis 101, the execution control section 207 executes predetermined commands. When the contact state data does not indicate the contact onto the first chassis 101, the execution control section 207 does not execute the commands. In addition, the execution control section 207 may select whether the commands are executed (toggle) whenever the contact state data indicating the contact onto the first chassis 101 is input.

The execution control section 207 turns on the LED lamp 141 when executing the predetermined commands and turns off the LED lamp 141 when not executing the commands. When turning on the LED lamp 141, the execution control section 207 outputs a power control signal indicating the start of power supply to the LED lamp 141 to the DC/DC converter 189. When turning off the LED lamp 141, the execution control section 207 outputs a power control signal indicating the stop of power supply to the LED lamp 141 to the DC/DC converter 189.

In addition, when the contact state data to be input indicates the vibration transmitted from the table, the execution control section 207 may determine to execute second commands other than the above commands. The execution control section 207 may select whether the second commands are executed whenever the contact state data indicating the vibration transmitted from the table is input.

Figure 8:
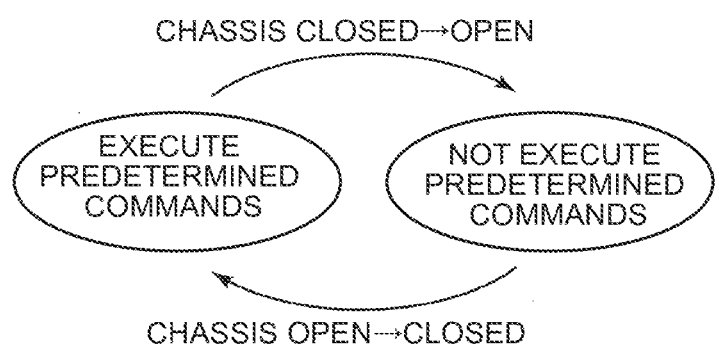
FIG. 8 is a state transition diagram illustrating an example of an execution state of a predetermined command according to an open or closed state.

When the open or closed state data indicating the closed state is input from the opening/closing determining section 203 during executing the command process, the execution control section 207 may stop the predetermined command process. Looking at it another way, the opening/closing determining section 203 enables the predetermined command process in accordance with an operational state in the closed state, and does not execute the predetermined command process regardless of an operational state in the open state (see FIG. 8).

As the predetermined command process, a process accompanied by one or both of the input and output that can fulfill the function even if being mainly in the closed state is executable. For example, like a voice command process, a process accompanied by the input of a voice signal from the microphone 125 and the play of voice from the speaker 126 may be employed as the predetermined command process. The voice command process includes a course of recognizing predetermined voice commands from voice uttered by the user and a course of executing a process (hereinafter, referred to as "voice instruction process") indicated by the recognized voice commands. The voice instruction process may employ, for example, phone call, sound recording, voice synthesis (text reading), and the like. Moreover, any one of phone call, sound recording, and voice synthesis may be indicated as the predetermined command process.

In addition, the information processing apparatus 1 may further include a display (not illustrated, hereinafter referred to as "second display") on the surface of the first chassis 101 separately from the display 103. In that case, as the predetermined command process, displaying information on the second display may be employed, or information to be displayed on the second display may be provided by voice commands. Moreover, a process different from the predetermined command process may be employed as a second command process related to the second commands. For example, phone call and voice synthesis may be respectively employed as the predetermined command process and the second command process.

(Vibration Strength Computation Process)

Next, a vibration strength computation process will be explained.

The acceleration processing section 201 acquires first acceleration data indicating a first acceleration S(t) at each time "t" from the acceleration sensor 104a. The first acceleration S(t) is three-dimensional vector quantity including $S_X(t)$, $S_Y(t)$, and $S_Z(t)$ as elements. Herein, X, Y, and Z indicate the directions of three sensitivity axes of the acceleration sensor 104a that are perpendicular to each other. For example, X, Y, and Z respectively indicate right, rear, and upper in the state where the first chassis 101 is closed. Herein, "t" is an index indicating sampling time. Sampling frequency is 100 Hz to 1000 Hz, for example.

As indicated by Equation (1), the acceleration processing section 201 computes first gravity values $G_X(t)$, $G_Y(t)$, and $G_Z(t)$ for sensitivity-axis directions at the time "t" by performing a weighted average on first gravity values $G_X(t-1)$, $G_Y(t-1)$, and $G_Z(t-1)$ for the respective directions at the previous time "t−1" and first accelerations $S_X(t)$, $S_Y(t)$, and $S_Z(t)$ for the respective directions at the time "t".

$$G_X(t)=\alpha \cdot G_X(t-1)+(1-\alpha) \cdot S_X(t)$$

$$G_Y(t)=\alpha \cdot G_Y(t-1)+(1-\alpha) \cdot S_Y(t)$$

$$G_Z(t)=\alpha \cdot G_Z(t-1)+(1-\alpha) \cdot S_Z(t) \quad (1)$$

In Equation (1), "α" indicates a forgetting coefficient, namely, a contribution degree of the first gravity value at the previous time "t−1" with respect to the first gravity value at the present time "t". A real number, e.g., 0.8, which is larger than zero and smaller than one, is used as the value of "α". Equation (1) indicates that a weighted average efficiency obtained by sequentially accumulating the latest first accelerations is estimated as the first gravity value and that a contribution degree to the first gravity value is higher as the first acceleration is acceleration at the time closer to the present time. Herein, "1−α" indicates a contribution degree of the latest first acceleration. In other words, a contribution degree of the first acceleration at the time close to the present time with respect to the first gravity value becomes lower as "α" is larger. In addition, initial values $G_X(0)$, $G_Y(0)$, and $G_Z(0)$ of the first gravity value are zero, for example.

Next, as indicated by Equation (2), the acceleration processing section 201 subtracts the first gravity values $G_X(t)$, $G_Y(t)$, and $G_Z(t)$ from the first accelerations $S_X(t)$, $S_Y(t)$, and $S_Z(t)$ for the sensitivity-axis directions to compute first vibration values $L_X(t)$, $L_Y(t)$, and $L_Z(t)$.

$$L_X(t)=S_X(t)-G_X(t)$$

$$L_Y(t)=S_Y(t)-G_Y(t)$$

$$L_Z(t)=S_Z(t)-G_Z(t) \quad (2)$$

As indicated by Equation (3), the acceleration processing section 201 multiplies a predetermined constant number K by a root-sum-square value of the first vibration values $L_X(t)$, $L_Y(t)$, and $L_Z(t)$ for the sensitivity-axis directions to compute a first vibration strength $I_s(t)$.

$$I_s(t)=K \cdot \sqrt{L_X(t)^2+L_Y(t)^2+L_Z(t)^2} \quad (3)$$

The acceleration processing section 201 can also performs the same process as that of the first acceleration data on the second acceleration data to compute second gravity values and a second vibration strength.

(Example of Vibration Strength)

Figure 4A:
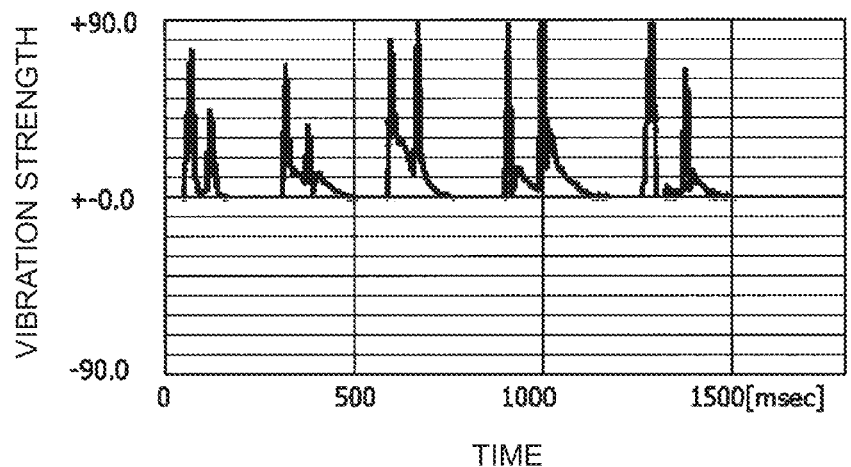
FIGS. 4A and 4B are diagrams illustrating examples of vibration strength.
Figure 4B:
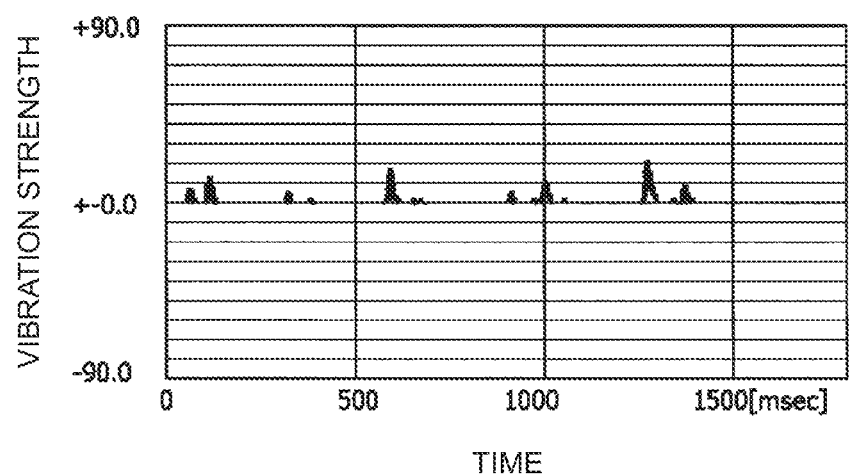

Next, an example of vibration strength computed by the acceleration processing section 201 will be explained. FIGS. 4A and 4B are diagrams illustrating examples of vibration strength. FIGS. 4A and 4B illustrate the first vibration strength and the second vibration strength that are observed when the first chassis 101 is tapped by a user in the state where the information processing apparatus 1 is placed on a table. The first vibration strength and the second vibration strength are respectively illustrated in FIGS. 4A and 4B. In the drawings, their vertical axis and horizontal axis respectively indicate a vibration strength (no unit) and a time (unit: msec).

The first vibration strength totally has values larger than the second vibration strength by five to six times. When the first chassis 101 is tapped, a vibration generated by the tapping is directly transmitted to the acceleration sensor 104a, and reaches the acceleration sensor 104c installed on the second chassis 102 via the hinge mechanisms 121a and 121b. In other words, because the vibration transmission pathway of the acceleration sensor 104a is shorter than that of the acceleration sensor 104c and the pathway of the acceleration sensor 104a is a direct pathway, the magnitude of attenuation from a tapping spot that acts as a vibration source becomes small. For that reason, it is considered that the first vibration strength becomes larger than the second vibration strength.

Figure 5A:
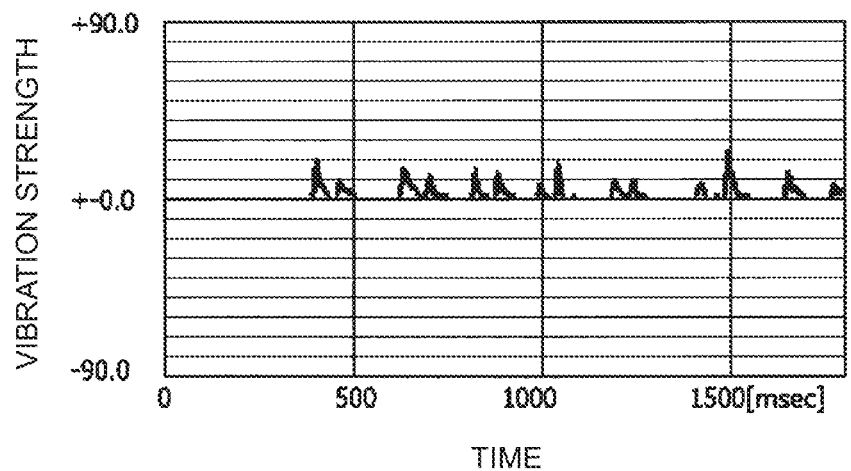
FIGS. 5A and 5B are diagrams illustrating other examples of vibration strength.
Figure 5B:
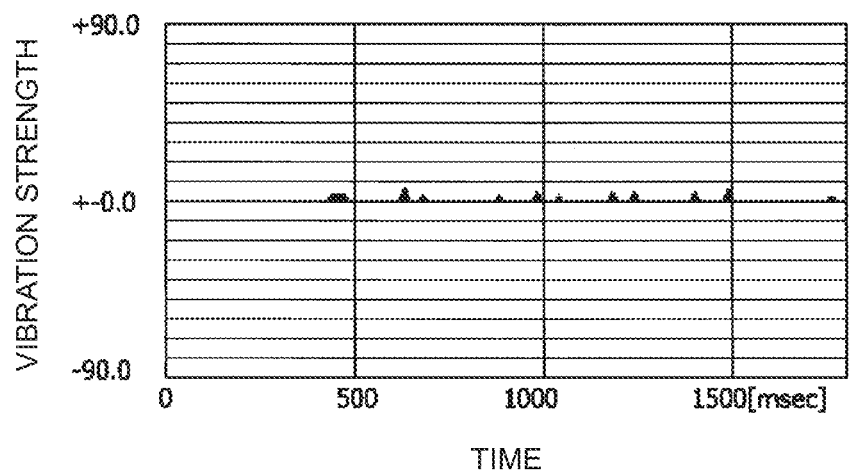

FIGS. 5A and 5B are diagrams illustrating other examples of vibration strength. FIGS. 5A and 5B illustrate the first vibration strength and the second vibration strength that are observed when the table is tapped by the user in the state where the information processing apparatus 1 is placed on the table via the bottom of the second chassis 102. The first vibration strength and the second vibration strength are respectively illustrated in FIGS. 5A and 5B.

The first vibration strength totally has values larger than the second vibration strength, but a ratio (hereinafter, referred to as "strength ratio") of the first vibration strength to the second vibration strength becomes smaller than that of the examples illustrated in FIGS. 4A and 4B. When the table is tapped, a vibration generated by the tapping reaches the acceleration sensor 104c installed on the second chassis 102 via the bottom of the second chassis 102, and also reaches the acceleration sensor 104a installed on the first chassis 101 via the hinge mechanisms 121a and 121b. For that reason, the difference between a distance from a tapping spot as the vibration source to the acceleration sensor 104a and a distance from the tapping spot to the acceleration sensor 104c becomes smaller than that of the examples illustrated in FIGS. 4A and 4B. Therefore, the difference of the magnitude of attenuation by the distance between the acceleration sensor 104a and the acceleration sensor 104c also decreases. Moreover, because the second chassis 102 is rotatably coupled to the first chassis 101 by using the hinge mechanisms 121a and 121b, the vibration of the first chassis 101 is excited by a vibration transmitted via the hinge mechanisms 121a and 121b. For that reason, in the examples illustrated in FIGS. 5A and 5B, the second vibration strength based on the acceleration detected by the acceleration sensor 104c installed on the second chassis 102 becomes larger than the first vibration strength. Nevertheless, the strength ratio meaningfully becomes smaller than that of the examples illustrated in FIGS. 4A and 4B. Therefore, the operation detecting section 205 can determine a contact state onto the first chassis 101 on the basis of the computed strength ratio.

(Command Execution Control)

Next, an example of a command execution control according to the embodiment will be explained.

Figure 6:
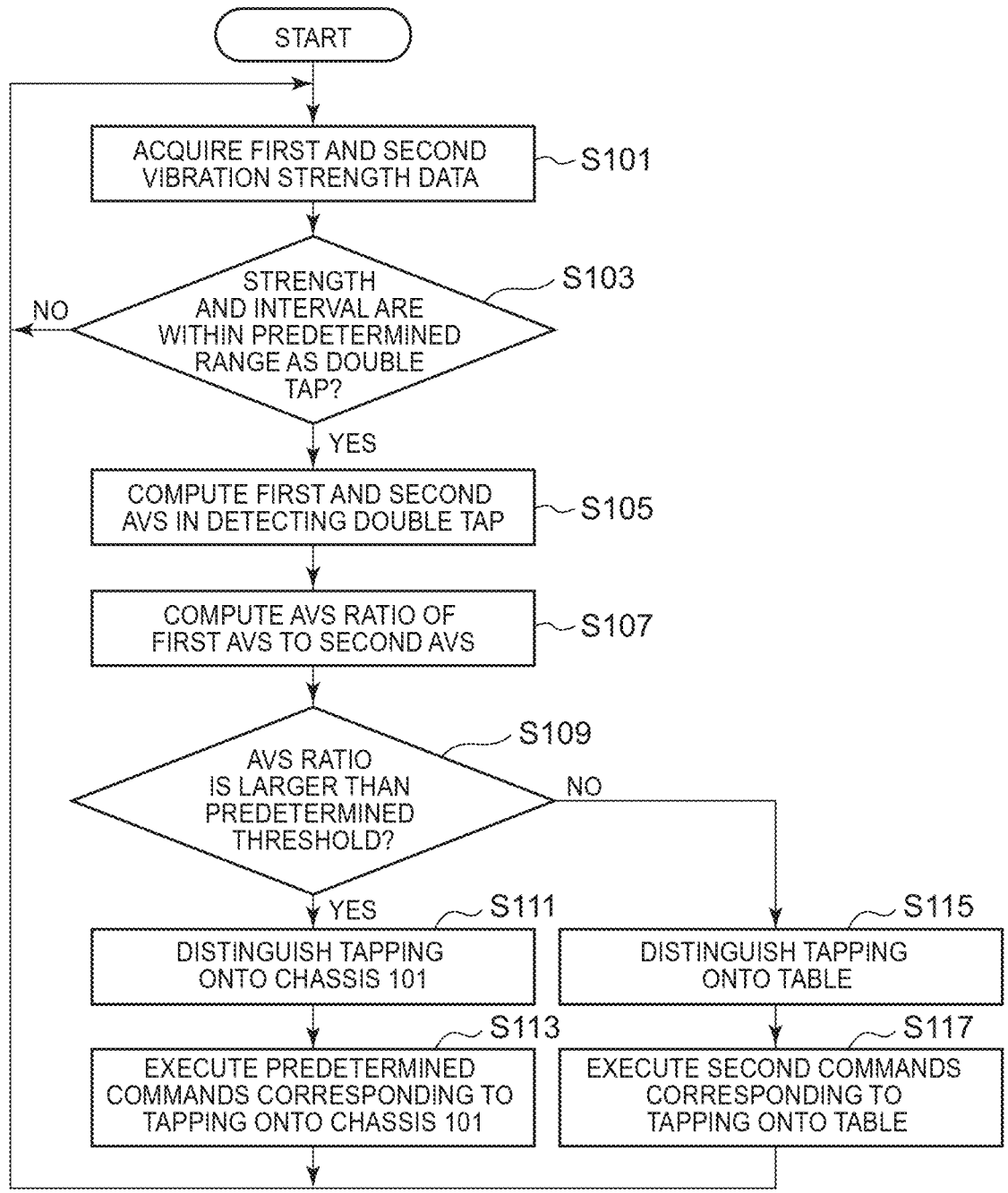
FIG. 6 is a flowchart illustrating an example of a command execution control according to the embodiment.

FIG. 6 is a flowchart illustrating an example of a command execution control according to the embodiment. The EC 171 executes a command execution control to be described hereinafter when it is determined that the first chassis 101 is opened relative to the second chassis 102. Moreover, the case where the operation detecting section 205 detects a double tap as the mode of contact onto the first chassis 101 will be explained as an example. A double tap is an operation to repeatedly tap the apparatus by multiple times (typically, two times) within a short time (e.g., 0.1 to 0.5 seconds).

The operation detecting section 205 acquires first vibration strength data and second vibration strength data from the acceleration processing section 201 (Step S101). After that, the operation detecting section 205 advances the process to Step S103. The operation detecting section 205 performs a double tap detection process on each of the first vibration strength data and the second vibration strength data, and determines whether a double tap has been detected (Step S103). Specifically, in the double tap detection process, the operation detecting section 205 detects the maximum value of the vibration strength within a predetermined time (e.g., one second) up to the present time. When detecting the maximum value, the operation detecting section 205 determines whether both of "the strengths of the detected latest maximum value and the next new maximum value and a time interval of these two maximum values" are values within a predetermined range corresponding to the double tap. When it is determined that both are values within the predetermined range, the operation detecting section 205 determines that the double tap has been detected. Otherwise, the operation detecting section 205 determines that the double tap has not been detected. When detecting the double tap on both the first vibration strength data and the second vibration strength data (Step S103: YES), the operation detecting section 205 advances the process to Step S105. When not detecting the double tap on at least one of the first vibration strength data and the second vibration strength data (Step S103: NO), the operation detecting section 205 repeats the process of Step S101.

As average vibration strengths (AVS) in detecting the double tap, the operation detecting section 205 computes a first AVS and a second AVS with respect to the first vibration strength data and the second vibration strength data (Step S105). A time in which the double tap according to the computation of AVS is detected is a zone of a predetermined length (e.g., 20 ms to 100 ms) that includes the time at which the latest maximum value is detected, for example. After that, the operation detecting section 205 advances the process to Step S107.

The operation detecting section 205 divides the first AVS by the second AVS to compute the result as an AVS ratio (Step S107). After that, the operation detecting section 205 advances the process to Step S109.

The operation detecting section 205 determines whether the computed AVS ratio is larger than a threshold of a predetermined AVS ratio (Step S109). When determining that the computed AVS ratio is larger than the threshold of the predetermined AVS ratio (Step S109: YES), the operation detecting section 205 advances the process to Step S111. When determining that the computed AVS ratio is not more than the threshold of the predetermined AVS ratio (Step S109: NO), the operation detecting section 205 advances the process to Step S115.

The operation detecting section 205 distinguishes contact (i.e., tapping) onto the first chassis 101 (Step S111). After that, the operation detecting section 205 advances the process to Step S113.

The execution control section 207 executes predetermined commands corresponding to the tapping onto the first chassis 101 (Step S113). When executing the predetermined commands, the execution control section 207 turns on the LED lamp 141. After that, the execution control section 207 returns the process to Step S101.

The execution control section 207 distinguishes the transmission (i.e., tapping onto table) of the vibration from the table (Step S115). After that, the execution control section 207 advances the process to Step S117.

The execution control section 207 executes second commands corresponding to the tapping onto the table (Step S117). When executing the second commands, the execution control section 207 turns on the LED lamp 141. After that, the execution control section 207 returns the process to Step S101.

When executing the predetermined commands at the time of advancing to Step S113, the execution control section 207 may stop executing the commands (toggle). When executing the second commands at the time of advancing to Step S113, the execution control section 207 may stop executing the second commands and execute only the predetermined commands (the first commands).

When executing the second commands at the time of advancing to Step S117, the execution control section 207 may stop executing the second commands (toggle). When executing the predetermined commands at the time of advancing to Step S117, the execution control section 207 may stop executing the predetermined commands and execute only the second commands.

In Step S109, a second threshold smaller than the predetermined threshold to advance to the process of Step S111 may be used as a determination threshold to advance to the process of Step S115. Then, the operation detecting section 205 advances the process to Step S115 when determining that the computed AVS ratio is not more than the second threshold (Step S109: NO). On the other hand, when determining that the computed AVS ratio is larger than the second threshold and is not more than the predetermined threshold, the operation detecting section 205 may perform guidance notice to promote second tapping and return the process to Step S101.

Among lighting modes (e.g., color, brightness, blinking pattern, and the like) when turning on the LED lamp 141, the execution control section 207 may differentiate a lighting mode when executing the second commands from a lighting mode when executing the predetermined commands. As a result, the user can easily distinguish which of the predetermined commands and the second commands is commands during being executed.

As a notifying unit that notifies the user of the execution of the predetermined commands or the second commands, the speaker 126 may be used instead of the LED lamp 141 or may be along with the LED lamp. When using the speaker 126, the execution control section 207 causes the speaker 126 to replay voice indicating a message "please tap it once again" as a predetermined guidance voice for example. The execution control section 207 previously sets voice data indicating the voice, and outputs the set voice data to the speaker 126.

Alternatively, a second display to be provided on the surface of the first chassis 101 may be used as the notifying unit. As a predetermined guidance display for example, the execution control section 207 causes the second display to display a character string indicating a message "please tap it once again". Therefore, whether or not the execution of the commands is required is determined by using the AVS ratio that enables more accurate determination, and a tap to again perform determination is promoted when accurate determination is difficult.

In the above explanation, the case where the execution control section 207 itself mainly executes the predetermined command process and the second command process has been explained as an example. However, the embodiment is not limited to this. The execution control section 207 may cause a system device (i.e., any one or an arbitrary combination of the CPU 151, the GPU 153, and the I/O controller 163) to execute a part or the whole of one or both of the predetermined command process and the second command process. When causing the system device to execute the processes, the execution control section 207 outputs a power control signal indicating power supply to devices related to the execution to the DC/DC converter 189, and supplies electric power to these devices. In this regard, however it is desirable that power consumption required for the predetermined command process and the second command process is smaller than power consumption in the normal operations of the information processing apparatus 1. Moreover, the device that executes the predetermined command process or the second command process may turn on the LED lamp 141 during executing the process, and turn off the LED lamp 141 when not executing the process.

In the process illustrated in FIG. 6, an opportunity to execute any one of the predetermined commands and the second commands may not be provided. When the process of Steps S115 and S117 is omitted for example, the process is returned to Step S101 when it is determined that the AVS ratio is not more than the predetermined threshold (Step S109: NO) in the process of Step S109. When the process of Steps S111 and S113 is omitted, the process is returned to Step S101 when it is determined that the AVS ratio is larger than the predetermined threshold (Step S109: YES) in the process of Step S109.

Figure 7:
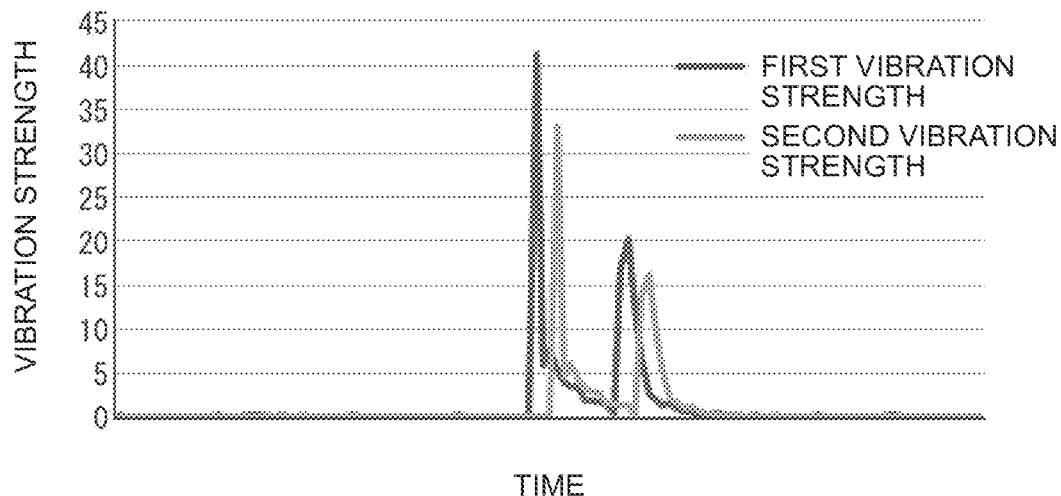
FIG. 7 is a diagram illustrating further another example of vibration strength.

In the above example, the case where the strength ratio (AVS ratio) is mainly used as relative characteristics between the first vibration strength and the second vibration strength has been explained as an example. However, the example is not limited to this. A time difference between detection timings of the first vibration and the second vibration may be used as relative characteristics. Typically, a vibration detected by a sensor closer to a vibration source is earlier detected. As illustrated in FIG. 7, when the first chassis 101 is tapped, the first vibration is detected earlier than the second vibration. In this regard, the operation detecting section 205 computes a detection time difference of the first vibration and the second vibration instead of the process of Steps S105 and S107 (FIG. 6). In that case, the operation detecting section 205 determines the contact onto the first chassis when the first vibration is detected earlier than the second vibration, and does not determine the contact onto the first chassis when the second vibration is detected earlier than the first vibration.

In the example illustrated in FIG. 6, the case where the double tap is detected in Step S103 has been explained as an example. However, the embodiment is not limited to this. After the process of Step S101, the operation detecting section 205 may advance the process to Step S105 without executing the process of Step 103. Moreover, in Step S103, a mode of tapping a detection target is not necessarily limited to a double tap. The tapping mode may be a single tap or a tapping series having a predetermined rhythm as a detection target.

For example, the operation detecting section 205 computes as a time difference a difference between the time of the latest maximum value of the first vibration strength and the time of the latest maximum value of the second vibration strength. The computed time difference corresponds to a difference between arrival times of vibrations to the acceleration sensors 104a and 104c from the vibration source. The operation detecting section 205 may compute a cross-correlation coefficient between a time series of the first vibration strength in the zone of the predetermined length up to the present time and a time series of the second vibration strength obtained by delaying a sampling time, every delay time of the sampling time. Then, among the computed cross-correlation coefficients, the operation detecting section 205 defines a delay time at which a cross-correlation coefficient becomes the maximum as the time difference. The defined time difference that is a negative value indicates that the first vibration strength goes ahead, and the time difference that is a positive value indicates that the second vibration strength goes ahead. In this regard, in the process of Step S109, the operation detecting section 205 may advance the process to Step S111 when the computed time difference is smaller than a first threshold, and advance the process to Step S115 when the computed time difference is larger than a second threshold. Herein, the first threshold is a predetermined value smaller than zero. The second threshold is a predetermined value larger than zero. When the computed time difference is not less than the first threshold and is not more than the second threshold, the operation detecting section 205 performs guidance notice to promote second tapping and returns the process to Step S101. In other words, depending on whether the time difference is meaningfully larger than zero, approximate zero, or is meaningfully smaller than zero, whether the predetermined commands are executed, guidance notice is performed, or the second commands are executed can be determined with high accuracy.

In this regard, however, in order to accurately obtain a time difference that is used for the determination, it is required that sampling frequencies of "the first vibration strength and the second vibration strength" and "the first acceleration and the second acceleration" are increased (for example, 200 Hz to 1 kHz). For that reason, power consumption required for the process becomes more. On the other hand, because it is sufficient to detect a maximum value by the contact when using the strength ratio as relative characteristics, the required sampling frequencies may not necessarily become high. For that reason, power consumption required for the process can be lowered. In this regard, however, it is necessary to preliminarily define a threshold that is used for the determination with an experiment.

The number N of the acceleration sensors 104a to be provided in the first chassis 101 and the number M of the acceleration sensors 104c to be provided in the second chassis 102 may be two or more. The acceleration processing section 201 generates vibration strength data indicating vibration strength on the basis of acceleration data acquired from each of the acceleration sensors. The operation detecting section 205 may compute the above relative characteristics for each of combinations of acceleration data of any of the N acceleration sensors 104a and acceleration data of any of the M acceleration sensors 104c. The operation detecting section 205 determines any of the contact onto the first chassis 101, guidance notice, and transmission of the vibration from the table on the basis of a statistical characteristic (e.g., average value) of the computed relative characteristics.

Among first vibration strengths obtained from the acceleration data of the N acceleration sensors 104a, the operation detecting section 205 may determine the channel of the acceleration sensor 104a that has the largest first vibration strength. The operation detecting section 205 previously sets therein a command association table indicating commands to be executed every channel, and specifies commands corresponding to a channel determined with reference to the command association table. Then, the operation detecting section 205 determines whether or not the commands specified instead of the above predetermined commands are executed on the basis of relative characteristics between the first vibration strength of the channel and any one of the second vibration strengths. Because executed commands corresponding to the acceleration sensor 104a closest to a place contacted during the operation onto the first chassis 101 is determined, different commands are performed in accordance with the place contacted by the operation.

(Operation onto Operation Switch)

Next, execution control of a command process based on an operation onto the operation switch 108 will be explained as an example. The operation detecting section 205 detects an operation onto the operation switch 108. When detecting pressing onto the operation switch 108, for example, the operation detecting section 205 detects a current that is generated when a first contact point associated with a button of the operation switch 108 contacts with a second contact point installed on a base of the operation switch 108 due to the pressing of the first contact point. When detecting the operation, the operation detecting section 205 outputs operational state data indicating the detection of the operation to the execution control section 207.

When the open or closed state data input from the opening/closing determining section 203 indicates the open state and the operational state data indicating the detection of the operation is input, the execution control section 207 activates a main body of the information processing apparatus 1. In this case, the execution control section 207 outputs to the DC/DC converter 189 a power control signal indicating power supply to devices that constitute the main body of the information processing apparatus 1, and then activates the devices. The devices that constitute the main body of the information processing apparatus 1 include the system device and devices operating under the control of the system device, and do not include the EC 171, devices operating under the control of the EC 171, and the DC/DC converter 189 and the power supply unit 191 required for the operation of the EC 171.

On the contrary, when the open or closed state data input from the opening/closing determining section 203 indicates the closed state and the operational state data indicating the detection of the operation is input, the execution control section 207 may not activate the main body of the information processing apparatus 1. In this case, the execution control section 207 may switch whether or not the predetermined commands are executed (toggle) whenever the operational state data is input. Looking at it another way, the opening/closing determining section 203 enables the predetermined command process in accordance with an operational state in the closed state, and activates the main body of the information processing apparatus 1 without executing the predetermined command process regardless of an operational state in the open state (see FIG. 8). In other words, contents of instructions indicated by an operation onto the operation switch 108 are different in accordance with open and closed states.

If it is possible to make the operation detecting section 205 detect the operation of the user, the operation switch 108 may employ any detection principle. The operation switch 108 is not necessarily limited to a button, and thus may be configured to include any of a pressure sensor, a capacitive sensor, an infrared sensor, an optical sensor, and the like, for example.

The case where the acceleration sensors 104a and 104c are mainly used in detecting an open or closed state indicating whether the first chassis 101 is opened or closed relative to the second chassis 102 has been explained as an example. However, the embodiment is not limited to this. For example, the information processing apparatus 1 may include a permanent magnet in any one and a magnetic sensor in the other of the front face of the first chassis 101 and the front face of the second chassis 102. The magnetic sensor detects a magnetic field generated by the permanent magnet, and outputs magnetic field data indicating the strength of the detected magnetic field to the opening/closing determining section 203. When the strength indicated by the magnetic field data input from the magnetic sensor exceeds a threshold of a predetermined strength, the opening/closing determining section 203 determines that the first chassis 101 is closed relative to the second chassis. On the other hand, when the strength of the magnetic field indicated by the magnetic data is not more than the threshold of the predetermined strength, the opening/closing determining section 203 determines that the first chassis 101 is opened relative to the second chassis.

As described above, the information processing apparatus 1 according to the embodiment includes a first chassis (e.g., the first chassis 101), in which at least one first vibration detecting unit (e.g., the acceleration sensor 104a) is provided, and a second chassis (e.g., the second chassis 102) in which at least one second vibration detecting unit (e.g., the acceleration sensor 104c) is provided. Moreover, the information processing apparatus 1 includes a controller (e.g., the EC 171) that determines the contact state of the first chassis on the basis of relative characteristics of a first vibration to a second vibration. Herein, the first vibration is a vibration detected by the first vibration detecting unit, and the second vibration is a vibration detected by the second vibration detecting unit.

Moreover, the controller determines whether a predetermined function (e.g., the predetermined commands) is executed in accordance with the contact state onto the first chassis.

According to this configuration, whether the first chassis is contacted as a vibration source is determined depending on the difference between transfer characteristics of vibrations of the first chassis from a contact place as a vibration source and the second chassis from a contact place. In the determination, an impact by the strength of the contact is offset by using relative characteristics. For that reason, the contact state onto the first chassis, consequently whether the predetermined function is required is precisely determined.

Then, the information processing apparatus 1 includes a notifying unit (e.g., the LED lamp 141) that notifies a user of a state where this predetermined function is operating when the controller determines that the predetermined function is required.

In accordance with this configuration, the user can easily grasp the operating state of the function by perceiving the notification by the notifying unit.

The above relative characteristics are a strength ratio of the first vibration to the second vibration. The controller determines the contact onto the first chassis when the strength ratio is larger than the threshold of the predetermined strength ratio, and does not determine the contact onto the first chassis when the strength ratio is not more than the threshold of the predetermined strength ratio.

According to this configuration, the controller determines the contact onto the first chassis when the strength ratio of the first vibration to the second vibration as relative characteristics is comparatively large, and does not determine the contact onto the first chassis when the strength ratio is small. Therefore, the determination of the presence or absence of the contact onto the first chassis can be economically realized.

The above controller defines, as a principal vibration zone, a plurality of zones, in which the maximum value of the strength is in a predetermined range and the interval between these zones is within a predetermined time, for each of the first and second vibrations. Herein, the relative characteristics are relative characteristics in at least a part of the principal vibration zone.

According to this configuration, the operation detecting section determines the presence or absence of the contact onto the first chassis for a zone in which a pattern of vibration caused by the plurality of contacts is within a range to be expected as the vibration pattern by contact. For that reason, the controller can instruct the operation detecting section to determine the presence or absence of the contact onto the first chassis by performing such an operation (e.g., double tap) that the vibration pattern is within the range to be expected. Moreover, the operation detecting section can more precisely determine the presence or absence of the contact onto the first chassis by using a vibration causing the vibration pattern within the range to be expected.

Moreover, the first and second vibration detecting units are respectively acceleration sensors. The components of the gravitational accelerations are subtracted from accelerations respectively detected by the first and second vibration detecting units to compute the strength of the first vibration and the strength of the second vibration.

Depending on this configuration, the strengths of vibrations extracted from accelerations detected by the acceleration sensors are used for the determination of the presence or absence of the contact onto the first chassis. For that reason, together with sharing the detected accelerations with another use application (e.g., the determination of an open or closed state of the first chassis with respect to the second chassis), the determination of the presence or absence of the contact onto the first chassis can be economically realized.

The information processing apparatus 1 includes an opening-closing mechanism (e.g., the hinge mechanisms 121a and 121b) that makes the first chassis to be openable and closable relative the second chassis while mutually coupling portions of the first and second chassis. When the first chassis is closed relative to the second chassis, the controller determines the contact state onto the first chassis.

Depending on this configuration, the determination of the contact state onto the first chassis is made when the first chassis is closed, and is not made when the first chassis is opened. For that reason, the controller can control the necessity or not of the function provided when the first chassis is closed and the main body is not activated.

The controller detects an open or closed state of the first chassis relative to the second chassis on the basis of the directions of the gravitational acceleration respectively detected by the first and second vibration detecting units.

Depending on this configuration, because it is not necessary to separately include a detecting unit used for the detection of the open or closed state, the detection function of the open or closed state can be economically implemented and the open or closed state can be also detected by a relatively simple process.

In the controller, the first and second vibration detecting units are provided at positions closer to a second lateral side (e.g., front face) facing a first lateral side (e.g., rear face) than the first lateral side on which the opening-closing mechanism is provided.

Because the first and second vibration detecting units are provided at positions substantially equidistant from the opening-closing mechanism, a vibration caused by the contact onto the first chassis is transmitted via the opening-closing mechanism to the second vibration detecting unit, and a vibration transmitted via the bottom of the second chassis from a table placing thereon the second chassis is transmitted via the opening-closing mechanism to the first vibration detecting unit. For that reason, the transfer characteristic of the vibration caused by the contact onto the first chassis to be transmitted to the second vibration detecting unit has a large difference from the transfer characteristic of the vibration transmitted via the bottom of the second chassis to be transmitted to the first vibration detecting unit. Therefore, the determination of the contact state onto the first chassis based on relative characteristics of the first vibration relative to the second vibration can be more precisely performed.

The information processing apparatus 1 includes the first chassis, the second chassis, the opening-closing mechanism, which makes the first chassis to be openable and closable relative to the second chassis while mutually coupling portions of the first and second chassis, and the controller. The controller detects an operation onto the apparatus itself. Then, when the first chassis is opened relative to the second chassis, the controller executes a first process as a process corresponding to the operation. When the first chassis is closed relative to the second chassis, the controller executes a second process different from the first process as a process corresponding to the operation.

Depending on this configuration, depending on whether the first chassis is opened relative to the second chassis, the controller can switch between functions to be executed for the operation onto the apparatus itself. For example, when the first chassis is opened relative to the second chassis, the controller activates the main body of the information processing apparatus 1 in accordance with an operation onto the device itself (e.g., the operation switch 108). On the other hand, when the first chassis is closed relative to the second chassis, the controller can execute the predetermined commands (voice command process etc.) in accordance with the operation.

In the embodiment, the first vibration detecting unit is provided in the first chassis and the second vibration detecting unit is provided in the second chassis. However, the present invention is not limited to this.

For example, when the information processing apparatus 1 is a tablet computer or a smartphone, the controller may use first and second acceleration data acquired from two vibration detecting units provided in one chassis to execute the above contact determination process. More specifically, it is sufficient that the chassis includes a first vibration detecting unit, which detects a vibration of its first surface (e.g., face, on which a display is mounted, namely front face), and a second vibration detecting unit that detects a vibration of a second surface (e.g., rear face) different from the first surface. The information processing apparatus 1 includes a direction detecting unit (e.g., gyroscope sensor) that detects the direction of the apparatus itself, for example. The controller decides, among the first and second surfaces, a surface having a normal direction, for which a cosine value with the gravitational force direction is a positive value, as a surface close to a table etc. on which the apparatus itself is placed (with which the apparatus itself contacts). Then, it is sufficient that the controller performs contact determination of whether the chassis is tapped or whether the table is tapped by using relative characteristics between the first vibration strength and the second vibration strength obtained from the first acceleration data and the second acceleration data as described above.

For example, when the second surface contacts with the table, the controller determines the contact onto the first chassis in the case of any one or both of the first case where the strength ratio of the first vibration to the second vibration is larger than the threshold of the predetermined strength ratio and the second case where the first vibration is detected earlier than the second vibration. In the other cases, the controller does not determine the contact onto the first chassis.

In addition, when deciding the surface close to the table etc. on which the apparatus itself is placed, the controller may use a gravitational force direction determined from a component of each sensitivity-axis direction of one of or an average value of both the first gravity value obtained from the first acceleration data and the second gravity value obtained from the second acceleration data. Because positional relationship between each sensitivity-axis direction and the first surface or the second surface is previously defined, the controller can compute a cosine value between the defined gravitational force direction and the normal direction of the first surface or the normal direction of the second surface. Therefore, the information processing apparatus 1 does not necessarily require to include a direction detecting unit separately from the first and second vibration detecting units.

As described above, the embodiment of the present invention has been described in detail with reference to the drawings, but the specific configuration is not limited to the above embodiment and also includes designs etc. without departing from the scope of the present invention. The components described in the above embodiment can be optionally combined.

The invention claimed is:

1. An information processing apparatus comprising:
   a first chassis having at least one first vibration detecting unit;
   a second chassis having at least one second vibration detecting unit, wherein a face of the second chassis overlaps with a face of the first chassis; and
   a controller that:
      determines a contact on the first chassis, when a vibration generated by a tapping is transmitted to the first vibration detecting unit and to the second vibration detecting unit, based on relative characteristics of a first vibration, detected by the first vibration detecting unit, with respect to a second vibration, detected by the second vibration detecting unit;
      distinguishes vibration accompanied by contact on the first chassis due to the tapping from vibration transmitted, via a bottom of the second chassis, from a structure that supports the information processing apparatus; and
      executes a predetermined command in at least one of a case where the contact is on the first chassis and a case where the vibration is from the structure.

2. The information processing apparatus according to claim 1, wherein:
   the relative characteristics include a strength ratio of the first vibration to the second vibration, and
   the controller determines contact on the first chassis when the strength ratio is larger than a predetermined strength ratio threshold, and does not determine contact on the first chassis when the strength ratio is not more than the predetermined strength ratio threshold.

3. The information processing apparatus according to claim 1, wherein:
   the relative characteristics include a detection time difference between the first vibration and the second vibration, and
   the controller determines contact on the first chassis when the first vibration is detected earlier than the second vibration, and does not determine contact on the first chassis when the second vibration is detected earlier than the first vibration.

4. The information processing apparatus according to claim 1, wherein:
   the controller defines, as a principal vibration zone, a plurality of zones in which a maximum value of a strength is in a predetermined range and an interval between these zones is in a predetermined range for each of the first vibration and the second vibration, and
   the relative characteristics include relative characteristics in at least a part of the principal vibration zone.

5. The information processing apparatus according to claim 1, wherein:
   the first and second vibration detecting units include acceleration sensors, and
   the controller subtracts components of gravitational accelerations from accelerations respectively detected by the first and second vibration detecting units to compute a strength of the first vibration and a strength of the second vibration.

6. The information processing apparatus according to claim 1, further comprising:
an opening-closing mechanism that causes the first chassis to be openable and closable relative to the second chassis while mutually coupling portions of the first chassis and the second chassis,
wherein the controller determines the contact on the first chassis when the first chassis is closed relative to the second chassis.

7. The information processing apparatus according to claim 6, wherein the controller detects an open or closed state of the first chassis relative to the second chassis based on directions of gravitational accelerations respectively detected by the first and second vibration detecting units.

8. The information processing apparatus according to claim 6, wherein the first and second vibration detecting units are closer to a second lateral side facing a first lateral side than the first lateral side on which the opening-closing mechanism is positioned.

9. The information processing apparatus according to claim 1, wherein the controller determines whether a predetermined function is required in accordance with the contact on the first chassis.

10. The information processing apparatus according to claim 9, further comprising:
a notifying unit that notifies a user of a state where the predetermined function is operating when the controller determines that the predetermined function is required.

11. A control method executed by an information processing apparatus,
the information processing apparatus comprising:
a first chassis having least one first vibration detecting unit; and
a second chassis having at least one second vibration detecting unit, and
the control method comprising:
determining a contact on the first chassis, when a vibration generated by a tapping is directly transmitted to the first vibration detecting unit and to the second vibration detecting unit, based on relative characteristics of a first vibration detected by the first vibration detecting unit with respect to a second vibration detected by the second vibration detecting unit;
distinguishing vibration accompanied by contact on the first chassis due to the tapping from vibration transmitted, via a bottom of the second chassis, from a structure that supports the information processing apparatus; and
executing a predetermined command in at least one of a case where the contact is on the first chassis and a case where the vibration is from the structure.

12. An information processing apparatus comprising:
a chassis having first and second vibration detecting units, wherein:
the first vibration detecting unit detects a vibration of a first surface of the chassis, and
the second vibration detecting unit detects a vibration of a second surface of the chassis; and
a controller that:
determines a contact state of on the first surface of the chassis based on relative characteristics of a first vibration detected by the first vibration detecting unit with respect to a second vibration detected by the second vibration detecting unit;
distinguishes vibration accompanied with contact on the first surface performed by the tapping from vibration transmitted via a bottom of the second surface from a structure that supports the information processing apparatus; and
executes a predetermined command in at least one of a case where the contact is on the first surface and a case where the vibration is from the structure.

* * * * *